(12) United States Patent
Xu et al.

(10) Patent No.: US 11,866,352 B2
(45) Date of Patent: Jan. 9, 2024

(54) METHOD FOR REMOVING CHLORINATED HYDROCARBONS IN GROUNDWATER THROUGH STEP-BY-STEP ELECTROCATALYTIC DECHLORINATION DEGRADATION

(71) Applicant: Nanjing University, Nanjing (CN)

(72) Inventors: Ke Xu, Nanjing (CN); Zhengqing Liu, Nanjing (CN); Sijia Ma, Nanjing (CN); Hongqiang Ren, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 18/119,421

(22) Filed: Mar. 9, 2023

(65) Prior Publication Data
US 2023/0312378 A1    Oct. 5, 2023

(30) Foreign Application Priority Data
Apr. 2, 2022    (CN) .......................... 202210350717.3

(51) Int. Cl.
*C02F 1/46* (2023.01)
*C02F 1/467* (2023.01)
(Continued)

(52) U.S. Cl.
CPC .......... *C02F 1/4674* (2013.01); *C02F 1/4676* (2013.01); *C02F 2001/46133* (2013.01);
(Continued)

(58) Field of Classification Search
CPC ........... B03C 5/02; B82Y 99/00; B82Y 30/00; C25B 1/02; C02B 9/08
See application file for complete search history.

(56) References Cited

FOREIGN PATENT DOCUMENTS

| | | |
|---|---|---|
| CN | 101074133 A | 11/2007 |
| CN | 101434429 A | 5/2009 |

(Continued)

OTHER PUBLICATIONS

Examination Report, issued in CN202210350717.3 (priority application), by CNIPA, dated Nov. 2, 2022.
(Continued)

*Primary Examiner* — Walter D. Griffin
*Assistant Examiner* — Cameron J Allen
(74) *Attorney, Agent, or Firm* — Zhu Lehnhoff LLP

(57) ABSTRACT

The present disclosure discloses a method for removing chlorinated hydrocarbons in groundwater through step-by-step electrocatalytic dechlorination degradation. A double-chamber electrolyzer reactor is used to carry out step-by-step electrocatalytic dechlorination degradation to remove chlorinated hydrocarbons in groundwater. The double-chamber electrolyzer reactor comprises a cathode chamber, a proton exchange membrane, an anode chamber and an intermediate processing unit, wherein the cathode chamber is separated from the anode chamber through the proton exchange membrane, and the intermediate processing unit is connected between the cathode chamber and the anode chamber through a cathode chamber water outlet, an anode chamber water inlet and pipelines. The double-chamber electrolyzer reactor adopted in the present disclosure is simple in structure and convenient to use, is capable of effectively enhancing the removal effect of electric catalysis on chlorinated hydrocarbon substances and reducing toxic and harmful substances produced by direct oxidization of chlorinated hydrocarbons, and has a good application prospect.

5 Claims, 3 Drawing Sheets

(51) Int. Cl.
  *C02F 103/06* (2006.01)
  *C02F 101/36* (2006.01)
  *C02F 1/461* (2023.01)

(52) U.S. Cl.
  CPC .... *C02F 2101/363* (2013.01); *C02F 2103/06* (2013.01); *C02F 2201/4611* (2013.01); *C02F 2201/4615* (2013.01); *C02F 2201/4618* (2013.01); *C02F 2201/46115* (2013.01); *C02F 2201/46135* (2013.01); *C02F 2201/46195* (2013.01)

(56) References Cited

FOREIGN PATENT DOCUMENTS

| | | |
|---|---|---|
| CN | 102887555 A | 1/2013 |
| CN | 104211141 A | 12/2014 |
| CN | 104370425 A | 2/2015 |
| CN | 104787851 A | 7/2015 |
| CN | 105712447 A | 6/2016 |
| CN | 106571498 A | 4/2017 |
| CN | 206089128 U | 4/2017 |
| CN | 107129011 A | 9/2017 |
| CN | 107739075 B | 2/2018 |
| CN | 1111250106 A | 6/2020 |
| JP | H10230291 A | 9/1998 |

OTHER PUBLICATIONS

Search Report, issued in CN202210350717.3 (priority application), by CNIPA, dated Apr. 2, 2022.
Search Report, prepared by Ying Hu and Weifeng Pan, dated Apr. 2, 2022.

METHOD FOR REMOVING CHLORINATED HYDROCARBONS IN GROUNDWATER THROUGH STEP-BY-STEP ELECTROCATALYTIC DECHLORINATION DEGRADATION

REFERENCE TO RELATED APPLICATIONS

The present application claims the priority of Chinese patent application No. 202210350717.3 filed on 2022 Apr. 2, the entire disclose of which is incorporated herein by reference.

TECHNICAL FIELD

The present disclosure relates to the technical field of deep wastewater treatment, particularly to a method for removing chlorinated hydrocarbons in groundwater through step-by-step electrocatalytic dechlorination degradation.

BACKGROUND

After multiphase separation, the residual organic matters in groundwater extract can be treated by catalytic oxidation. Via detection, main pollutants in actual wastewater of a soil project include benzene ring substances and chlorinated hydrocarbons. These pollutants have not only carcinogenic, teratogenic, mutagenic and endocrine disrupting effects but also stable chemical properties, can be stored in water, soil, sediment and other environmental media for a long time, and are widely applied in industry to flow into nature, thereby increasingly threatening ecological environment and human health.

Chlorinated organic matters are difficultly removed directly due to the existence of a C—Cl bond. Furthermore, the direct oxidation of chlorobenzene substances can produce harmful substances such as polychlorinated benzodiazepine heterocycles (PCDD/Fs), and therefore the chlorobenzene substances should be dechlorinated before degradation so that the C—Cl bond is broken by utilizing hydrodechlorination, resulting in enhanced degradation performance of chlorine-containing organic pollutants in water.

The groundwater contains high chloride ion concentration and high conductivity, so it is suitable for an electrochemical method. In addition, considering that chlorinated hydrocarbons need to undergo dechlorination via reduction followed by oxidative degradation, and electric catalysis just can achieve the reduction of a cathodic reduction and an anodic oxidation. A cathode chamber is separated from an anode chamber by a proton exchange membrane, which meets the requirements on oxidation and reduction respectively. Therefore, by using double-chamber electrolyzer reactor, wastewater first passes through the cathode chamber and the anode chamber to achieve the effect of dechlorination and then degradation.

SUMMARY

Chlorinated hydrocarbons in groundwater are high in content and difficult to oxidize and degrade, which affects the effect of deeply treating groundwater to degrade pollutants. To solve the above technical problem, the present disclosure provides a method for removing chlorinated hydrocarbons in groundwater through step-by-step electrocatalytic dechlorination degradation, so that chlorinated hydrocarbons in wastewater can be oxidized and degraded after reduction and dechlorination so as to be sufficiently treated.

The technical solution of the present disclosure is as follows: provided is a method for removing chlorinated hydrocarbons in groundwater through step-by-step electrocatalytic dechlorination degradation, in which chlorinated hydrocarbons in groundwater is removed by using a double-chamber electrolyzer reactor through step-by-step electrocatalytic dechlorination degradation, the double-chamber electrolyzer reactor comprises a cathode chamber, a proton exchange membrane, an anode chamber and an intermediate processing unit, the cathode chamber comprises a cathode chamber water inlet arranged at one side of the cathode chamber, a cathode plate arranged in the cathode chamber, and a cathode chamber water outlet arranged at the other side of the cathode chamber, the anode chamber comprises an anode chamber water inlet arranged at one side of the anode chamber, an anode plate arranged in the anode chamber, and an anode chamber water outlet arranged at the other side of the anode chamber, the cathode chamber is separated from the anode chamber through the proton exchange membrane, and the intermediate processing unit is connected between the cathode chamber and the anode chamber through the cathode chamber water outlet, the anode chamber water inlet and pipelines;

a flow path for allowing groundwater to pass is that groundwater passes through the cathode chamber water inlet located at the lower end of the cathode chamber to enter the cathode chamber via a pressure pump, the chlorinated hydrocarbon molecules are directly reduced near the cathode plate, and water molecules are dissociated at the cathode plate according to a Tafer principle and a Helovsky principle to generate H to attack the C—Cl bond of the chlorinated hydrocarbon molecules for indirect reduction and then converted into organic matters with low chlorine content, and then the organic matters flow out of the cathode chamber water outlet located at the upper end of the cathode chamber to enter the intermediate processing unit to be treated, which is mainly because after the reaction occurs in the cathode chamber, the concentration of $OH^-$ increases due to the capture of H in water molecules, and the pH value of the groundwater rises and becomes alkaline, and therefore it is needed for the intermediate processing unit to perform acidification adjustment on groundwater so that the pH value of groundwater is reduced to 6.5-7.5 while the redox potential of the groundwater is changed, facilitating subsequent oxidization and degradation reaction in the anode chamber; after that, the groundwater passes through the anode chamber water inlet located at the lower end of the anode chamber to enter the anode chamber, and the organic matter molecules after being reduced and dechlorinated are directly oxidized near the anode plate and active free radial oxidized organic matters such as Cl and OH are generated on the anode plate for indirect oxidization so that the organic matters are degraded and mineralized, and the treated groundwater, that is, the effluent obtained by step-by-step electrocatalytic dechlorination degradation, flows out of the anode chamber water outlet located at the upper end of the anode chamber.

Further, the groundwater passes through the cathode chamber water inlet to enter the cathode chamber for dechlorination, then the effluent after dechlorination is transported into the intermediate processing unit for acidification adjustment, and the effluent after acidification adjustment passes through the anode chamber water inlet to enter the anode chamber to be treated and then discharged.

Further, the anode chamber needs to be filled with an electrolyte solution prior to removing chlorinated hydrocarbons in groundwater through step-by-step electrocatalytic dechlorination degradation. In the starting stage of a step-by-step electrocatalytic system, since the chlorinated hydrocarbon substances that are not reduced and dechlorinated should not be oxidized directly in the anode chamber, the anode chamber should be filled with a certain concentration of electrolyte solution to form a passage in an electrolytic tank, so that electrolysis starts. After the electrolysis is implemented to a certain degree, a certain amount of chlorinated hydrocarbon wastewater can be fully dechlorinated and then introduced into the anode region, and the electrolyte solution is discharged from the water outlet of the anode region, and the initiating stage of step-by-step electrolysis is ended.

Further, the material of the cathode plate is amorphous nickel phosphide, the material of the anode plate is a Ti-based ruthenium-iridium electrode, and the proton exchange member is a Du Pont Nafion 117 membrane. The material of the cathode plate is amorphous nickel phosphide which is a miniature nanorod structure substance with a super-hydrophilic surface and low resistance, can effectively release H· in water to attack and break C—Cl, and is suitable for an electrocatalytic cathode for reduction and dechlorination; the material of the anode plate is the Ti-based ruthenium iridium electrode, and the Ti anode has the advantages of excellent conductivity and corrosion resistance, long service life, low cost and the like; ruthenium oxide and iridium oxide, as noble metal oxides, have good conductivity and high oxygen evolution potential, and are anode materials that are the most widely applied at present; the proton exchange membrane is the Du Pont Nafion 117 membrane which mainly functions as separating the cathode region from the anode region, so that different redox environments can be constructed in the two electrode regions, and redox reactions are each conducted in the electrode regions.

Further, both the cathode plate and the anode plate are of a network structure, and the cathode plate and anode plate of the double-chamber electrolyzer reactor are of a network structure, for the purpose of increasing the effective contact area of the electrode plate in the groundwater and enhancing the mass transfer of organic pollutants; both the cathode plate and the anode plate are square, and the centers of the cathode plate and anode plate are both welded with connecting piles, the connecting pile extends from the hole in the side wall of the double-chamber electrolyzer reactor to be connected with wires, and the wires are connected with a power supply, and the cathode plate and anode plate of the double-chamber electrolyzer reactor are connected with the negative electrode and the positive electrode of the power supply respectively through the connecting piles and the wires.

Further, working conditions for removing chlorinated hydrocarbons in groundwater through step-by-step electrocatalytic dechlorination degradation in the double-chamber electrolyzer reactor are as follows: the voltage is 3-10 V, the temperature is 20-30° C., the retention time 3-5 h, the electrolyte concentration is 5-10 mg/L, but are not limited to the above parameters, and specific condition parameters are determined by the quality of the treated groundwater wastewater.

Further, a solvent of an electrolyte solution for removing chlorinated hydrocarbons in groundwater through step-by-step electrocatalytic dechlorination degradation in the double-chamber electrolyzer reactor is NaCl. Since the groundwater containing high chlorinated hydrocarbon content contains correspondingly high chlorine ion content, and therefore the solvent of the electrolyte solution adopts NaCl.

Further, the intermediate processing unit comprises a processing cabin, and the processing cabin is divided into a power region located on the upper part inside the processing cabin and a mixing region located on the lower part in the processing cabin through a partition, the inner top surface of the processing cabin is provided with a drive cavity for loading a fan blade, the lower bottom surface of the drive cavity penetrates through the partition through a plurality of groups of draft tubes and is communicated with the mixing region, the fan blade is arranged inside the drive cavity in a rotation manner and the fan blade penetrates through the lower bottom surface of the drive cavity through a shaft rod and is clamped with a drug adding assembly, the drug adding assembly comprises a screw sleeve clamped with the shaft rod of the fan blade, the screw sleeve is in threaded connection with a screw for downward pressing a drug adding box, one side of the screw corresponding to the drug adding box is provided with a press plate, and the screw sleeve and the shaft rod are matched and clamped with a clamp slot through clamp blocks, the lower bottom surface of the partition corresponding to the position of the drug adding box is provided with a catheter for drug delivery, the catheter penetrates through the partition and is communicated with the outlet of the drug adding box, the upper surface of the partition corresponding to the position of the press plate is provided with a plurality of groups of guide rods that are slidably connected with the press plate and used for restricting the rotation of the press plate.

Through the structural arrangement of the above intermediate processing unit, the amount of a squeezed adjuster in the drug adding box can be dynamically adjusted by utilizing the flow rate of water flow injected into the intermediate processing unit without electrically driven elements. The intermediate processing unit is convenient to use and low in failure rate and can effectively meet the acidification regulation requirements of the double-chamber electrolyzer reactor, thus facilitating subsequent oxidation and degradation reaction in the anode chamber.

Still further, the drug adding box is specifically a sac loaded with diluted hydrochloric acid, one side of the upper surface of the processing cabin is provided with a liquid inlet, one side of the lower bottom surface of the processing cabin is provided with a liquid outlet, the processing cabin located in the mixing region is provided with a horn mouth-shaped spacer ring for river diversion, the upper part of the horn mouth-shaped spacer ring is in seal connection with the processing cabin, the lower part of the horn mouth-shaped spacer ring is provided with an outlet, and the outlet is staggered with the liquid outlet.

Through the above structure arrangement, the rapid mixing of groundwater in the intermediate processing unit and the adjuster can be effectively improved, and the retention time of groundwater is prolonged in the limited mixing space of the intermediate processing unit.

The present disclosure has the beneficial effects:

(1) The present disclosure provides a method for removing chlorinated hydrocarbons in groundwater through step-by-step electrocatalytic dechlorination degradation, the used double-chamber electrolyzer reactor is simple in structure and convenient to use, and a set of complete chlorinated hydrocarbon treatment process flow is constructed by breakage of the C—Cl bond to remove the chlorine atom followed by degradation and mineralization, thereby effectively enhancing the removal effect of electric catalysis on chlorinated hydrocarbon substances and reducing toxic and harmful substances produced by direct oxidization of chlorinated hydrocarbons. Thus, the present disclosure meets the green and environmental-friendly ideal and has good application prospects.

(2) The present disclosure provides an intermediate processing unit that optimizes the acidification adjustment of the double-chamber electrolyzer reactor, the amount of the squeezed adjuster in the drug adding box can be dynamically adjusted by utilizing the flow rate of water flow injected into the intermediate processing unit without electrically driven elements, the intermediate processing unit is convenient to use and low in failure rate and can effectively meet the acidification regulation requirements of the double-chamber electrolyzer reactor.

Wherein, 1—cathode; 2—proton exchange member; 3—anode chamber; 4—intermediate processing unit; 41—processing cabin; 411—liquid inlet; 412—liquid outlet; 42—partition; 43—drive cavity; 431—draft tube; 44—fan blade; 441—shaft rod; 45—screw sleeve; 46—screw; 461—press plate; 462—guide rod; 47—drug adding box; 48—catheter; 49—horn mouth-shaped spacer ring; 491—outlet; 5—cathode chamber water inlet; 6—cathode plate; 7—cathode chamber water outlet; 8—anode chamber water inlet; 9—anode plate; 10—anode chamber water outlet; 11—connecting pile; 12—power supply.

DETAILED DESCRIPTION OF THE EMBODIMENTS

Next, the present disclosure will be further described in detail in combination with specific embodiments to better exhibit the advantages of the present disclosure.

Example 1

Figure 1:
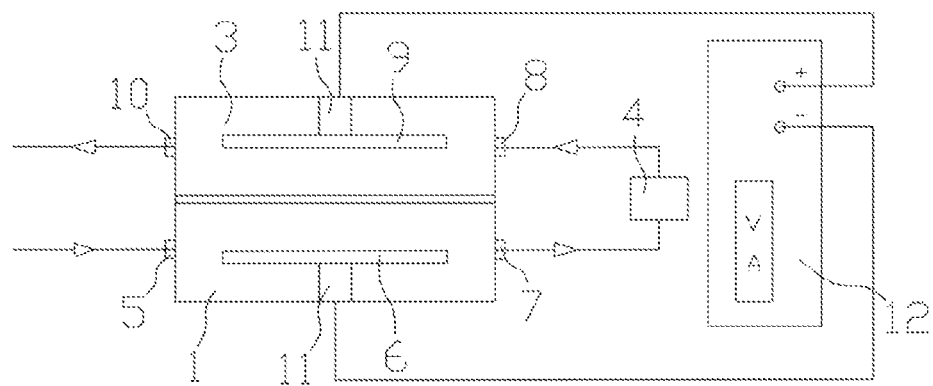
FIG. 1 is a diagram of a method for removing chlorinated hydrocarbons in groundwater through step-by-step electrocatalytic dechlorination degradation according to the present disclosure.

As shown in FIG. 1, it shows a method for removing chlorinated hydrocarbons in groundwater through step-by-step electrocatalytic dechlorination degradation. Water pipe joints of a double-chamber electrolyzer reactor are assembled; via a water pipe of a pressurizing pump, a water inlet bucket is connected with a cathode chamber water inlet 5, and an intermediate processing unit 4 is connected with an anode chamber water inlet 8; via a water pipe, a cathode chamber water outlet 7 is connected with the intermediate processing unit 4, and an anode region water outlet 10 is connected with a water outlet bucket; the positive electrode of a power supply 12 is connected with a connecting pile 11 of an anode plate 9 via the wire, the negative electrode of the power supply 12 is connected with the connecting pile 11 of a cathode plate 6 via the wire, so as to complete the assembling of the double-chamber electrolyzer reactor.

As shown in FIG. 1, when the groundwater continuously flows and is treated, an anode chamber 3 is filled with a NaCl electrolyte solution, the power supply is turned on, and then the groundwater in the water inlet bucket continuously passes through a cathode chamber water inlet 5 through a pressure pump to enter a cathode chamber 1 to be reduced ad dechlorinated, then the effluent after dechlorination passes through a cathode chamber water inlet 7 to enter an intermediate processing unit 4 to be acidified to be neutral, the effluent passes through an anode chamber water inlet 8 through the pressure pump to discharge the NaCl electrolyte solution in an anode chamber 3 from an anode chamber water outlet 10. After a hydraulic retention time, the start-up phase ends, and then the effluent discharged from the water outlet bucket at the anode chamber water outlet 10 is effluent formed after the groundwater wastewater containing chlorinated hydrocarbons is treated; the voltage is 3 V, the temperature is 25° C., the hydraulic retention time is 5 h, the electrolyte concentration is 5 mg/L, the chemical oxygen demand (COD) concentration is reduced from 1428 mg/L to 824 mg/L, and the COD removal rate is 42.3%.

Figure 2:
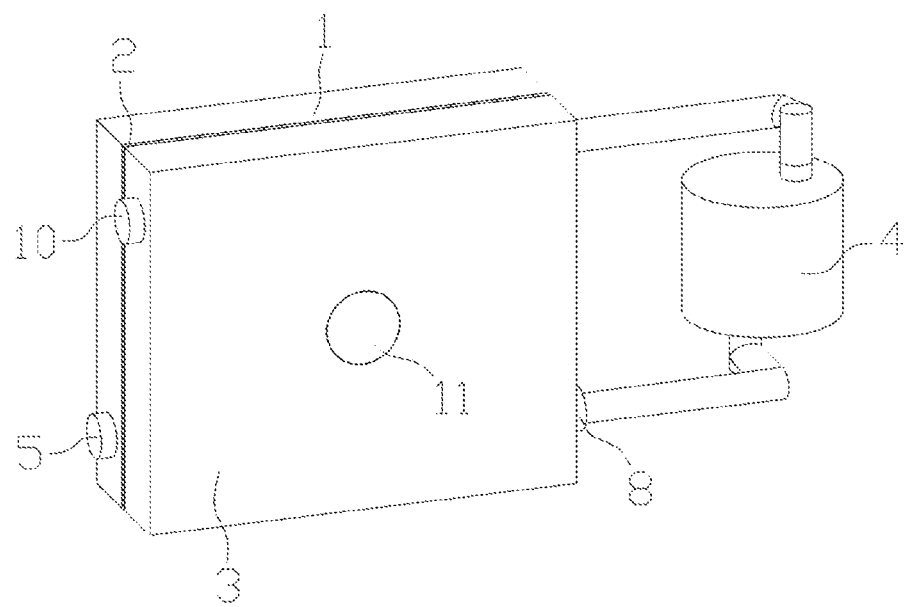
FIG. 2 is a structural diagram of a double-chamber electrolyzer reactor according to the present disclosure.

As shown in FIG. 1 and FIG. 2, the double-chamber electrolyzer reactor comprises a cathode chamber 1, a proton exchange membrane 2, an anode chamber 3 and an intermediate processing unit 4. The cathode chamber 1 comprises a cathode chamber water inlet 5 arranged at one side of the cathode chamber 1, a cathode plate 6 arranged in the cathode chamber 1, and a cathode chamber water outlet 7 arranged at the other side of the cathode chamber 1. The anode chamber 3 comprises an anode chamber water inlet 8 arranged at one side of the anode chamber 3, an anode plate 9 arranged in the anode chamber 3 and an anode chamber water outlet 10 arranged at the other side of the anode chamber 3, the cathode chamber 1 is separated from the anode chamber 3 through the proton exchange membrane 2, and the intermediate processing unit 4 is connected between the cathode chamber 1 and the anode chamber 3 through the cathode chamber water outlet 7, the anode chamber water outlet 8 and pipelines, where, the material of the cathode plate 6 is amorphous nickel phosphide ANP, the material of the anode plate 9 is a Ti-based ruthenium-iridium electrode, the material of the proton exchange membrane 2 is a Du Pont Nafion 117 membrane, and both of the cathode plate 6 and anode plate 9 are of a network structure.

Example 2

Figure 3:
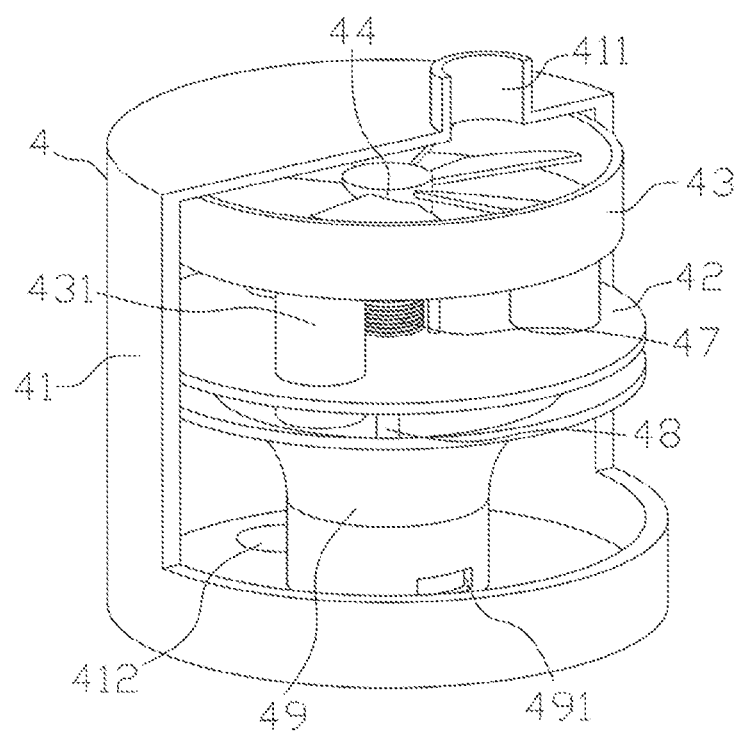
FIG. 3 is a diagram of an internal structure of an intermediate processing unit according to the present disclosure.

This example is basically the same as example 1 except that as shown in FIG. 3, the intermediate processing unit 4 comprises a processing cabin 41, the processing cabin 41 is divided into a power region located on the upper part inside the processing cabin 41 and a mixing region located on the lower part in the processing cabin 41 through a partition 42.

As shown in FIG. 3, the inner top surface of the processing cabin 41 is provided with a drive cavity 43 for loading a fan blade 44, the lower bottom surface of the drive cavity 43 penetrates through the partition 42 through three groups of draft tubes 431 and is communicated with the mixing region, the fan blade 44 is arranged inside the drive cavity 43 in a rotation manner and the fan blade 44 penetrates through the lower bottom surface of the drive cavity 43 through a shaft rod 441 and is clamped with a drug adding assembly.

Figure 4:
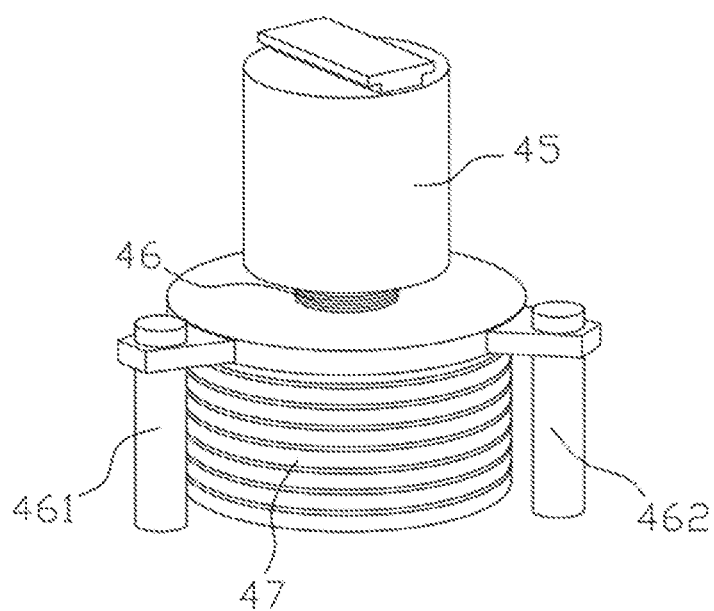
FIG. 4 is a structural diagram of a drug adding assembly of an intermediate processing unit according to the present disclosure.
Figure 5:
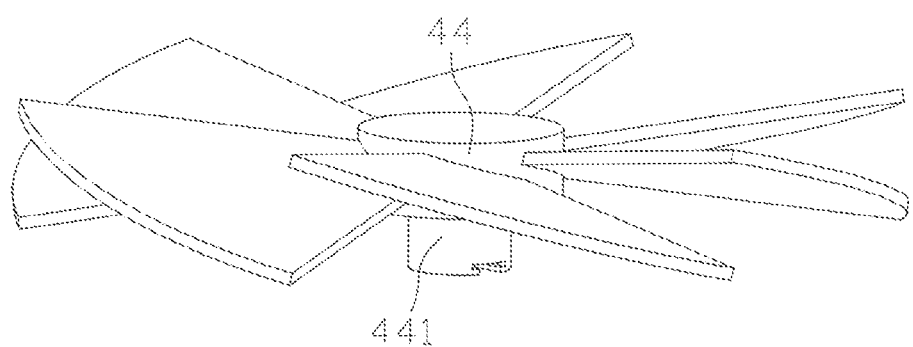
FIG. 5 is a structural diagram of a fan blade of an intermediate processing unit according to the present disclosure.

As shown in FIGS. 3, 4 and 5, the drug adding assembly comprises a screw sleeve 45 clamped with the shaft rod 441 of the fan blade 44, the screw sleeve 45 is in threaded connection with a screw 46 for downward pressing a drug adding box 47, one side of the screw 46 corresponding to the drug adding box 47 is provided with a press plate 461, the screw sleeve 45 and the shaft rod 441 are matched and clamped with a clamp slot through clamp blocks.

As shown in FIG. 4, the lower bottom surface of the partition 42 corresponding to the position of the drug adding box 47 is provided with a catheter 48 for drug delivery, the catheter 48 penetrates through the partition 42 and is communicated with the outlet of the drug adding box 47, the upper surface of the partition 42 corresponding to the position of the press plate 461 is provided with three groups of guide rods 462 that are slidably connected with the press plate 461 and used for restricting the rotation of the press plate 461, and the drug adding box 47 is communicated with the catheter 48 through a commercially available pressure release one-way valve.

As shown in FIG. 3, the drug adding box 47 is specifically a sac loaded with diluted hydrochloric acid, one side of the upper surface of the processing cabin 41 is provided with a liquid inlet 411, one side of the lower bottom surface of the processing cabin 41 is provided with a liquid outlet 412, the processing cabin 41 located in the mixing region is provided with a horn mouth-shaped spacer ring 49 for river diversion, the upper part of the horn mouth-shaped spacer ring 49 is in seal connection with the processing cabin 41, the lower part of the horn mouth-shaped spacer ring 49 is provided with an outlet 491, and the outlet 491 is staggered with the liquid outlet 412, specifically, the outlet 491 is staggered with the liquid outlet 412 at an angle of 180°.

The working method of the above intermediate processing unit 4 is as follows:

The groundwater wastewater enters the drive cavity 43 from the liquid inlet 411 through the pipeline, and the water flow pushes the fan blade 44 to rotate, thus driving the screw sleeve 45 of the dosing assembly to rotate under the rotation drive of the fan blade 44. Under the rotation of the screw sleeve 45 in combination with the synergy of the screw 46, the press plate 461 and the guide rod 462, the screw 46 moves downward along the guide rod 462 under the rotation of thread drive, and thus the diluted hydrochloric acid in the drug adding box 47 flows into the catheter 48 through a one-way valve under the pressure of the press plate 461, then is introduced into the catheter 48 to perform acidification adjustment with the groundwater. During this period, the groundwater is converged and mixed with the wastewater in the catheter 48 through the horn mouth-shaped spacer ring 49, and then the effluent flows out from the outlet 491 and discharged from the outlet 412 at an angle of 180°.

Example 3

This example is basically the same as example 1 except that when the continuous flow circulation of groundwater is cycled, connection is performed by using a connection mode in example 1, the anode chamber 3 is filled with a NaCl electrolyte solution, a power supply is turned on, and the groundwater in the water inlet bucket is continuously introduced into a cathode chamber water inlet 5 through a pressure pump to be subject to reduction and dechlorination in the cathode chamber 1, and then enters an intermediate processing unit 4 from a cathode chamber water outlet 7 to be acidized to be neutral, the acidized groundwater is introduced into an anode chamber water inlet 8 through the pressure pump, the NaCl electrolyte solution is discharged from an anode chamber water outlet 10. After a hydraulic retention time, the start-up phase ends. The water inlet bucket is connected with the cathode chamber water inlet 5 to form a closed path to start operation, so that the effluent in the anode chamber 3 returns to the water inlet bucket. The voltage is 3 V, the temperature is 25° C., the hydraulic retention time is 5 h, the operation time is 5 h, and the electrolyte concentration is 5 mg/L, the COD concentration is decreased from 1419 mg/L to 802 mg/L, and the COD removal rate is 43.5%.

Example 4

This example is basically the same as example 1 except that when the groundwater is subject to intermittent operation, an anode chamber 3 is filled with a NaCl electrolyte solution, and the groundwater in a water inlet bucket is introduced into a cathode chamber water inlet 5 through a pressure pump until the cathode chamber 1 is fully filled, a power supply is turned on, and the groundwater remains for a certain operation time in the cathode chamber 1 for reduction and dechlorination, then the power supply is turned off, the NaCl electrolyte solution in an anode chamber 3 is discharged from an anode chamber water inlet 8, and the treated groundwater in the cathode chamber 1 is discharged from a cathode chamber water inlet 5 to a intermediate processing unit 4 to be acidified to be neutral, and then the groundwater is introduced into the anode chamber water inlet 8 through the pressure pump, and the start-up stage is ended. The groundwater in the water inlet bucket is introduced into the cathode chamber water inlet 5 again through the pressure pump until the cathode chamber 1 is fully filled, the power supply is turned on, and so on; the voltage is 3 V, the temperature is 25° C., the hydraulic retention time is 5 h, the operation time is 5 h, the electrolyte concentration is 5 mg/L, the COD concentration is reduced from 1425 mg/L to 786 mg/L, and the COD removal rate is 44.8%.

What is claimed is:

1. A method for removing chlorinated hydrocarbons in groundwater through step-by-step electrocatalytic dechlorination degradation, wherein chlorinated hydrocarbons in groundwater is removed by using a double-chamber electrolyzer reactor through step-by-step electrocatalytic dechlorination degradation, the groundwater passes through a cathode chamber water inlet (5) to enter a cathode chamber (1) to be dechlorinated, then an effluent is transported into an intermediate processing unit (4) for acidification adjustment, the effluent after acidification adjustment passes through an anode chamber water inlet (8) to enter an anode chamber (3) to be treated and then discharged, the anode chamber (3) needs to be filled with an electrolyte solution prior to removing chlorinated hydrocarbons in groundwater through step-by-step electrocatalytic dechlorination degradation;

the double-chamber electrolyzer reactor comprises the cathode chamber (1), a proton exchange membrane (2), the anode chamber (3) and the intermediate processing unit (4), the cathode chamber (1) comprises the cathode chamber water inlet (5) arranged at one side of the cathode chamber (1), a cathode plate (6) arranged in the cathode chamber (1), and a cathode chamber water outlet (7) arranged at another side of the cathode chamber (1), the anode chamber (3) comprises the anode chamber water inlet (8) arranged at one side of the anode chamber (3), an anode plate (9) arranged in the anode chamber (3), and an anode chamber water outlet (10) arranged at another side of the anode chamber (3), the cathode chamber (1) is separated from the anode chamber (3) through the proton exchange membrane (2), and the intermediate processing unit (4) is connected between the cathode chamber (1) and the anode chamber (3) through the cathode chamber water outlet (7), the anode chamber water outlet (8) and pipelines, the intermediate processing unit (4) comprises a processing cabin (41), and the processing cabin (41) is divided into a power region located on the upper part inside the processing cabin (41) and a mixing region located on the lower part inside the processing cabin (41) through a partition (42), the inner top surface of the processing cabin (41) is provided with a drive cavity (43) for loading a fan blade (44), the lower bottom surface of the drive cavity (43) penetrates through the partition (42) through a plurality of groups of draft tubes (431) and is communicated with the mixing region, the fan blade (44) is arranged inside the drive cavity (43) in a rotation manner and the fan blade (44) penetrates through the lower bottom surface of the drive cavity (43) through a shaft rod (441) and is clamped with a drug adding assembly, the drug adding assembly comprises a screw sleeve (45) clamped with the shaft rod (441) of the fan blade (44), the screw sleeve (45) is in threaded connection with a screw (46) for downward pressing a drug adding box (47), one side of the screw (46) corresponding to the drug adding box (47) is provided with a press plate (461), the screw sleeve (45) and the shaft rod (441) are matched and clamped with a clamp slot through clamp blocks, the lower bottom surface of the partition (42) corresponding to the position of the drug adding box (47) is provided with a catheter (48) for drug delivery, the catheter (48) penetrates through the partition (42) and is communicated with the outlet of the drug adding box (47), the upper surface of the partition (42) corresponding to the position of the press plate (461) is provided with a plurality of groups of guide rods (462) that are slidably connected with the press plate (461) and used for restricting the rotation of the press plate (461), the drug adding box (47) is specifically a sac loaded with diluted hydrochloric acid, one side of the upper surface of the processing cabin (41) is provided with a liquid inlet (411), one side of the lower bottom surface of the processing cabin (41) is provided with a liquid outlet (412), the processing cabin (41) located in the mixing region is provided with a horn mouth-shaped spacer ring (49) for river diversion, the upper part of the horn mouth-shaped spacer ring (49) is in seal connection with the processing cabin (41), the lower part of the horn mouth-shaped spacer ring (49) is provided with an outlet (491), and the outlet (491) is staggered with the liquid outlet (412).

2. The method for removing chlorinated hydrocarbons in groundwater through step-by-step electrocatalytic dechlorination degradation according to claim 1, wherein both of the cathode plate (6) and the anode plate (9) are of a network structure.

3. The method for removing chlorinated hydrocarbons in groundwater through step-by-step electrocatalytic dechlorination degradation according to claim 1, wherein working conditions for removing chlorinated hydrocarbons in groundwater through step-by-step electrocatalytic dechlorination degradation in the double-chamber electrolyzer reactor are as follows: the voltage is 3-10V, the temperature is 20-30° C., and the retention time is 3-5 h.

4. The method for removing chlorinated hydrocarbons in groundwater through step-by-step electrocatalytic dechlorination degradation according to claim 1, wherein a solute of an electrolyte solution for removing chlorinated hydrocarbons in groundwater through step-by-step electrocatalytic dechlorination degradation in the double-chamber electrolyzer reactor is NaCl.

5. The method for removing chlorinated hydrocarbons in groundwater through step-by-step electrocatalytic dechlorination degradation according to claim 1, wherein the material of the a node plate (9) is a Ti-based ruthenium-iridium electrode, and the material of the cathode plate (6) is amorphous nickel phosphide.

* * * * *